Patented Aug. 8, 1939

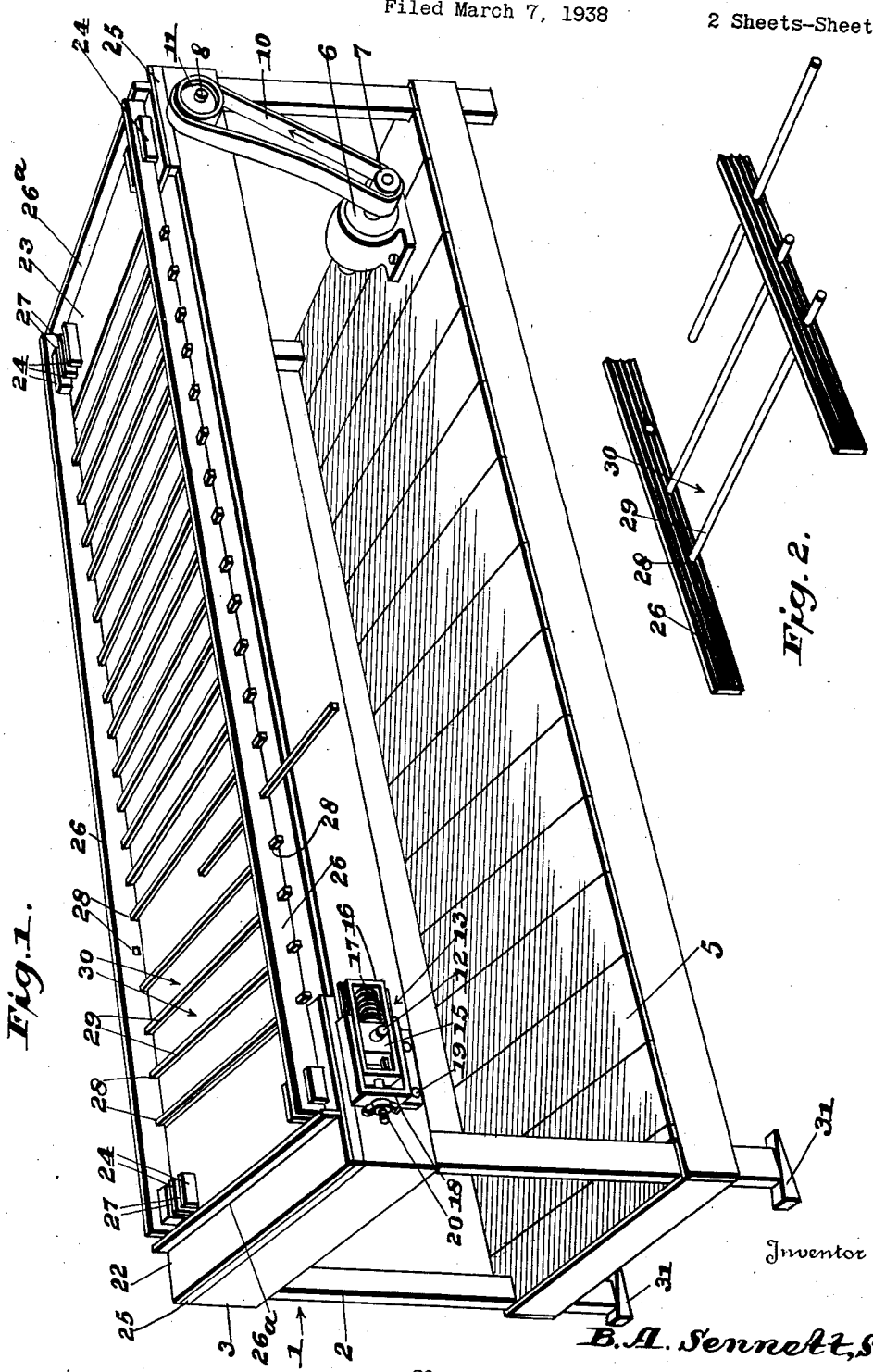

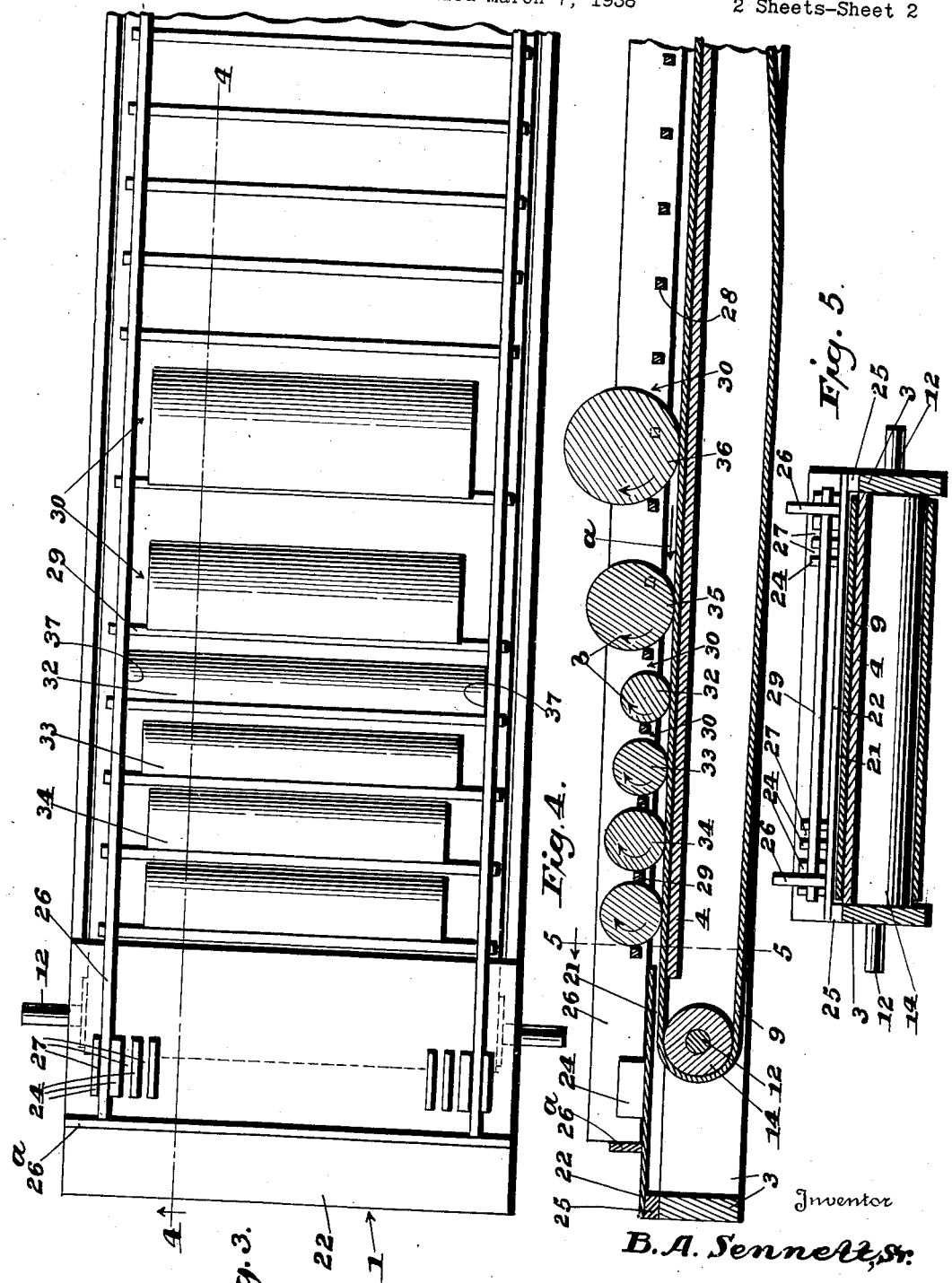

2,168,963

UNITED STATES PATENT OFFICE 2,168,963

CANDY STICK MACHINE AND METHOD OF MAKING

Bernard A. Sennett, Sr., Memphis, Tenn.

Application March 7, 1938, Serial No. 194,492

10 Claims. (Cl. 107—13)

This invention relates to the art of manufacturing candy, especially to the making of stick candy. The current practice is to work the candy batch into cylindrical form, and in the instance of large sticks, running from one pound to one hundred pounds in weight, the practice is to cut the ends as nearly square as possible so that the finished product may be stood upon one end for display purposes.

The handling of the smaller weights of candy sticks does not involve particular difficulties, but the heavier weights do involve difficulties both in rolling and cooling. In order to facilitate the operation of manufacturing candy sticks, especially of the heavier kinds, the herein disclosed machine has been devised, the use of which virtually requires the emplacing thereupon of the candy batches, the rolling, cooling and flat-ending being accomplished automatically.

With this preamble in mind, the objects of the invention are as follows:

First, to provide a machine for shaping and coating large sticks of candy.

Second, to provide a machine for elongating sticks of candy by rolling them, at the same time flattening the ends so that they will stand upright alone.

Third, to provide for varying the size of the stick of candy to be worked upon, so that sticks of a fairly large diversity of weights can be rolled, cooled and flat-ended simultaneously.

Fourth, to provide a simple adjustment by which the altitude of one end of the conveyor can be changed for a purpose to be described.

Fifth, to improve the method of forming candy sticks whereby rolling and cooling are accomplished simultaneously, the flat-ending constituting the final and finishing step.

Other objects and advantages will appear in the following specification, reference being had to the accompanying drawings, in which:

Figure 1 is a perspective view of the machine.

Figure 2 is a detail perspective view illustrating the use of cylindrical stop members instead of cross sectionally square ones, as in Fig. 1.

Figure 3 is a plan view of the machine also illustrating the method.

Figure 4 is a longitudinal section taken on the line 4—4 of Fig. 3.

Figure 5 is a cross section taken on the line 5—5 of Fig. 4.

In carrying out the invention, provision is made of a frame generally designated 1. This frame resembles a table inasmuch as it has legs 2, supporting stiles 3 and a top 4, (Fig. 4). A platform 5 is provided in spaced relationship to the top 4 and fairly close to the floor, for the purpose of holding buckets, boxes, in fact anything which it is desired to store and keep within access to the operator of the machine.

Said platform also provides a convenient place for a motor 6. The drive pulley 7 of the motor operates the shaft 8 of a belt conveyor 9 (Fig. 4), through the medium of a drive belt 10, which is applied to the pulley 7 and to a pulley 11 on one end of the shaft 8. Said shaft is located near one end of the frame 1. A similar but idle shaft 12 is located near the other end of the frame.

A belt tightener 13 of any desired type is used in conjunction with the shaft 12, its purpose, obviously, being to keep the conveyor 9 tight upon the rollers on the two shafts 8, 12. Only one of the rollers is shown, namely, 14 on the shaft 12, but it will be understood that the shaft 8 has an identical roller.

Briefly describing the tightener 13 as one type which can be used, it will be seen that each end of the shaft 12 (only one being shown) is journalled in a block 15 which is slidably guided in a frame 16. A stout spring 17 between one end of this frame and the adjacent side of the block 15, pushes the block 15 forwardly and thus keeps the conveyor 9 under tension. The frame 16 is slidably guided in a casting 18 which is appropriately secured at 19 to an adjacent one of the stiles 3. An adjusting means 20, connected between the frame 16 and casting 18, provides for an increase or decrease in the tension of the spring 17.

It will be observed in Fig. 4 that the table top 4 is used as a foundation for the top flight of the conveyor 9. Inasmuch as the top 4 has to support considerable weight, it will, in practice, be firmly attached to the longitudinal stiles and cross braced in any manner which may be required. The opposite ends of the conveyor 9 enter passages 21 which are formed between said conveyor and aprons 22, 23. These aprons conceal the ends of the conveyor and the rollers over which the conveyor travels, having as their particular purposes the function of mounts for sets of spacer blocks 24.

The foregoing passages 21 (Fig. 4) are formed by inserts 25 which are built up from the stiles 3 at the ends, as shown. The use of the inserts is not necessarily adhered to because the aprons 22, 23, may be elevated with respect to the stiles in any one of a variety of ways to produce the passages mentioned.

Reverting to the spacer blocks 24, these are provided in sufficient numbers to enable the operator to set the side boards 26 into such longitudinally aligning recesses 27 as will space the side boards the desired distances apart laterally of the conveyor. These side boards are for the purpose of flat-ending the candy, the rolling of the latter being carried out until they have lengthened sufficiently to meet the side boards, whereupon the ends will be formed perfectly flat, so that they will stand on end for display purposes.

The side boards 26 have laterally registering openings 28. These may either be non-circular as in Fig. 1, or round, as in Fig. 2.

These registering openings are for the purpose of supporting correspondingly formed stop members 29, either the cross sectionally non-circular rods in Fig. 1, or the cylindrical rods in Fig. 2. The holes 28 are kept in registration by header boards 26a which provide limiting means for the ends of the side boards 26.

Said stop members are sufficiently long that when the side boards 26 are set at their widest adjustment there is enough projection of each stop member to afford a hand hold for the operator to enable his pulling wanted sticks out. The reason for pulling the sticks out is to regulate the size of the stalls 30 which the sticks define with the conveyor 9 and side boards 26.

An adjusting device is provided for elevating one end of the frame 1 to correspondingly elevate the same end of the conveyor 9. This device may comprise any known means for raising the respective set of legs, a convenient showing consisting of wedges 31 which may be driven under as far as desired to produce the effect.

These wedges will usually be used in conjunction with the stop members 29, although it is possible to use either the stop members alone or the wedges alone and the result of this is clearly brought out in the following description of

*The operation*

Assume that sticks of candy 32, 33, 34, 35 and 36 (Fig. 4) of various weights are to be rolled into cylindrical forms. The stop members 29 are pulled out and reinserted in the openings 28 on such an order as to produce stalls 30 of the desired sizes. This adjustment of the sizes of the stalls is plainly indicated in Fig. 4.

At this point it is to be noted that the openings 28 are placed as low as possible along the side boards 26, bringing them as close to the top plane of the conveyor 9 as possible. It is desirable to locate the stop members 29 below the center lines or axes of the various candy sticks, and inasmuch as it is necessary to anticipate the manufacture of a relatively small candy stick, such as 32, and still keep the stop member below the axis, the reason will be seen for placing the stop members in the manner stated.

When the conveyor 9 is started, the direction of motion being designated by the arrow a (Fig. 4), a rolling motion will be imparted to all of the candy sticks (arrows b, Fig. 4). Since the candy sticks bear downward upon the conveyor, and the direction of motion of the latter is forward, it follows that the candy sticks will tend to move toward the stop members at the left. However, the circumference of each candy stick will bear against the respective stop member only lightly, thereby keeping the candy stick in its stall without cutting into the surface of the soft mass.

As rolling progresses, the mass will become cooled and elongated at the same time. In Fig. 3 the three sizes of sticks 32, 33 and 34 illustrate one of the effects of the rolling. Suppose that the sticks 32, 33 and 34 were originally of the size of the stick 34, but that the three sticks were emplaced upon the conveyor at different times. After a period of rolling the stick 34 becomes reduced in diameter but elongated to the size of the stick 33. After more rolling its diameter becomes reduced still more, and it will elongate until its ends 37 touch the side boards 26. Said side boards will cause the ends to become perfectly flat so that the finished stick can be stood upon one of its ends for display purposes.

If the adjusting device, consisting of the wedges 31, is used to elevate the forward end of the frame, namely that end toward which the conveyor 9 is travelling, it will be found that the rotating candy sticks will seldom touch the adjacent stop members. Under such an adjustment the candy sticks will tend to roll backward (toward the right) whereas the forward motion of the conveyor (arrow a, Fig. 4) carries the candy stick forward. As a result of the two forces counteracting each other the candy sticks will remain in virtually one position upon the conveyor in their respective stalls.

The method which comprises a part of the invention consists of the following steps, first, placing a roughly cylindrical batch of warm and soft candy upon a traveling conveyor, second, confining the batch in a virtually fixed position upon the conveyor, third, providing stop members at the lateral limits of the conveyor to be abutted by the candy stick as it is rolled, cooled and elongated, thereby flat-ending the stick.

I claim:

1. A candy stick machine comprising a traveling conveyor to impart a rolling motion to a stick of candy emplaced thereupon, a pair of side boards spaced apart laterally of the conveyor, and means by which to keep the stick rolling in virtually one position upon the conveyor until elongated sufficiently to touch the side boards at its ends.

2. A candy stick machine comprising a traveling conveyor to impart a rolling motion to a stick of candy emplaced thereupon, a pair of side boards spaced apart laterally of the conveyor, and stop members disposed crosswise of and above the conveyor, defining stalls for the candy sticks to keep them rolling in virtually one position until their ends touch the side boards.

3. A candy stick machine comprising a traveling conveyor to impart a rolling motion to a stick of candy emplaced thereupon, a pair of side boards spaced apart laterally of the conveyor, and an adjusting device by which to elevate that end of the conveyor toward which its travel occurs, thereby to keep the stick rolling in virtually one position upon the conveyor.

4. A candy stick machine comprising a traveling conveyor to impart a rolling motion to a stick of candy emplaced thereupon, a pair of side boards spaced apart laterally of the conveyor, stop members disposed crosswise of and above the conveyor, defining stalls for the candy sticks, and adjusting means by which to elevate one end of the conveyor thereby to keep the candy stick floating between adjacent stop members so that said stick will seldom touch the stop.

5. A machine for shaping a plastic substance into cylindrical form, comprising a traveling support upon which the substance is emplaced for rolling, and means simultaneously defining a stall for said substance and providing a flattener for the ends of the substance as it becomes elongated.

6. A candy stick machine comprising a traveling conveyor to impart a rolling motion to a stick of candy emplaced thereupon, a pair of side boards spaced apart laterally of the conveyor, and a plurality of stop members disposed crosswise of the conveyor, said side boards having means by which said members are detachably carried at their ends.

7. A candy stick machine comprising a frame, a traveling conveyor carried by the frame and being adapted to impart a rolling motion to a stick of candy emplaced thereupon, means providing stalls into which the candy sticks are located, and means by which to raise that end of the frame toward which the top flight of the conveyor is made to travel, thereby to counteract the rolling tendency of the candy sticks and prevent them from touching adjacent stop means.

8. A candy stick machine comprising a frame, aprons on the ends of the frame, a traveling conveyor carried by the frame, adapted to impart a rolling motion to a stick of candy emplaced thereupon, the ends of the conveyor being covered by the aprons, a pair of side boards disposed longitudinally of the conveyor, and means upon the aprons in which the side boards are adjustably set to vary their spacing laterally of the conveyor.

9. A candy stick machine comprising a frame, aprons on the ends of the frame, a traveling conveyor carried by the frame, adapted to impart a rolling motion to a stick of candy emplaced thereupon, the ends of the conveyor being covered by the aprons, a pair of side boards disposed longitudinally of the conveyor, means upon the aprons in which the side boards are adjustably set to vary their spacing laterally of the conveyor, and a plurality of stop means fitted crosswise of the conveyor and being carried by the side boards, said stop members being sufficiently long to project beyond the side boards at their widest adjustment.

10. A machine for shaping a plastic substance into cylindrical form, comprising a traveling support upon which the substance is emplaced for rolling, and means providing an abutment, being located crosswise of the traveling support to block the passage of said substance and against which said substance is subjected to a rolling action by the travel of said support.

BERNARD A. SENNETT, Sr.